No. 607,025.  
J. H. ECKART.  
NUT LOCK.  
(Application filed Feb. 18, 1898.)
Patented July 12, 1898.
(No Model.)
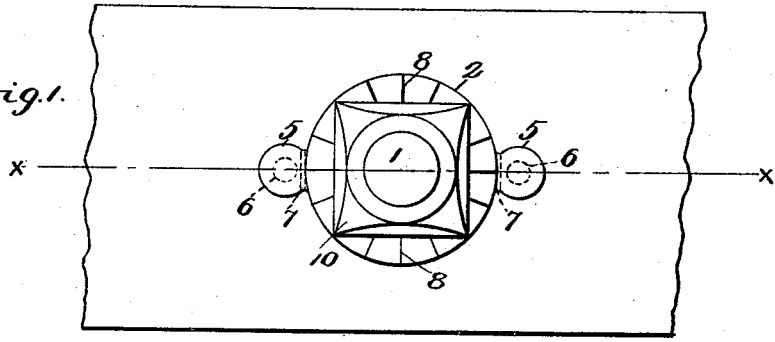
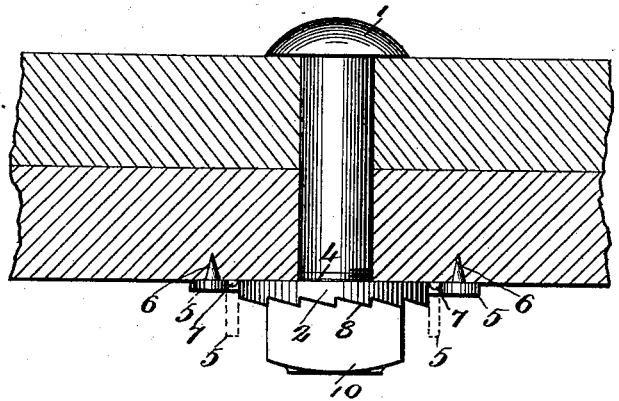
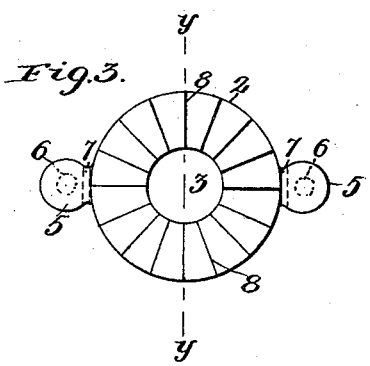  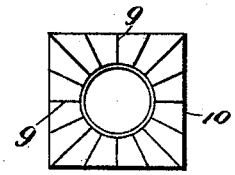
WITNESSES:  
Alfred A. Mathey  
E. Elliott
INVENTOR  
John H. Eckart.  
BY  
Heller & Heller  
ATTORNEYS

UNITED STATES PATENT OFFICE.

JOHN H. ECKART, OF JOPLIN, MISSOURI.

NUT-LOCK.

SPECIFICATION forming part of Letters Patent No. 607,025, dated July 12, 1898.

Application filed February 18, 1898. Serial No. 670,759. (No model.)

*To all whom it may concern:*

Be it known that I, JOHN H. ECKART, a citizen of the United States, residing at Joplin, in the county of Jasper and State of Missouri, have invented certain new and useful Improvements in Nut-Locks, of which the following is a full, clear, and exact description, reference being had to the accompanying drawings, forming a part hereof.

My invention relates to improvements in nut-locks; and it consists in the novel combination and arrangement of parts more particularly described in the specification and pointed out in the claims.

In the drawings, Figure 1 is a side elevation of my complete invention as applied. Fig. 2 is a longitudinal section taken on the line $x$ $x$ of Fig. 1. Fig. 3 is a front view of the washer which I employ in carrying out my invention. Fig. 4 is a horizontal section taken on the line $y$ $y$ of Fig. 3, and Fig. 5 is a rear elevation of the nut on that side that comes in contact with the washer.

The object of my invention is to construct a washer and nut in such a manner that when the nut is turned against the washer the nut will be automatically locked and thus prevented from being turned in the opposite direction or loosened under the constant vibration of the parts to be held together; and it consists of an ordinary bolt which is adapted to be passed through suitable holes made for its reception in the parts to be held and clamped, a washer provided with an opening for receiving the bolt and having radially-arranged ratchet-teeth formed on one of its faces or that face with which the nut comes in contact, two ears formed integral with the washer and projecting from the outer circular edge of the same and arranged diametrically opposite one another, a groove formed in each of said ears, the metal left by said grooves which connects the washer and ears being comparatively thin and thus weakened, whereby the ears may be either readily bent or severed from the washer for allowing the latter to turn for removing or unscrewing the nut from the bolt, pins projecting from one side of the ears and adapted to enter the wood or other material against which the washer is brought in contact for preventing the washer from being turned in either direction, a nut the engaging surface or face of which is also provided with radially-arranged ratchet-teeth which properly mesh or coöperate with the ratchet-teeth on the washer, and in other details now to be specifically described.

Referring to the drawings, 1 represents an ordinary bolt, which is passed through an opening of the several parts to be secured together in the usual manner.

The washer 2, which forms a part of the nut-lock, is circular in shape and provided with a central opening 3 of such a size as to be readily passed over the projecting screw-threaded end of the bolt 1 and its plane or smooth surface 4 brought in contact with one of the parts to be secured together, with the head of the bolt against the other part. Formed integral with said washer and located diametrically opposite one another are two ears 5, and projecting from each ear and in the same direction is a pin 6, which is forced into the wood or other material against which the washer is brought in contact for preventing the latter from turning in either direction. Grooves 7 are formed or cut a suitable depth in the metal at a point where the ears and washer unite, the metal left being comparatively thin in order that the said ears may be either easily and quickly severed from the washer or bent at approximately right angles to the washer to draw the pins out of the wood into which they had been previously forced, a chisel or other suitable instrument being driven between the ears and wood.

Formed upon the outer or opposite face of the washer are radially-arranged ratchet-teeth 8, with which coöperate the radially-arranged ratchet-teeth 9, formed on one side of the nut 10, when the latter is turned against said washer in drawing and holding the several parts together.

When the ears are severed or bent in the manner previously described, the nut and washer may be simultaneously turned and both removed from the bolt, and should the metal of which the washer is composed be comparatively soft or pliable the lugs may be again bent back to their normal positions and the washer again used. In any instance, however, it will be seen that the bolt and nut are never disabled in applying and removing the same, the washer being the only part that may be at all destroyed, which can be manufactured at a very nominal cost.

The construction of the washer herein described is particularly adapted for wooden construction, such as bridges and the like, but can be used with like results on metal construction or against the ordinary fish-plates which connect the meeting ends of rails by forming holes in the said plates for receiving the pins.

Having fully described my invention, what I claim is—

1. A nut-lock, comprising an ordinary bolt, a washer having ratchet-teeth formed on the same and adapted to coöperate with the ratchet-teeth on the nut, and a holding device forming an integral part of the washer, and adapted to be bent or severed for permitting the washer to turn, substantially as described.

2. A nut-lock, comprising an ordinary bolt, a circular washer having ratchet-teeth formed on one of its faces, a nut also having ratchet-teeth formed on one side of the same and coöperating with the ratchet-teeth on the washer, ears formed integral with the washer and also located diametrically opposite one another, a pin projecting from each ear, and a groove formed on each ear, and adjacent to the washer, whereby the metal is reduced, as and for the purpose described.

In testimony whereof I affix my signature in presence of two witnesses.

JOHN H. ECKART.

Witnesses:
FRED. H. MAYFIELD,
FRANK DEHUE.